(12) United States Patent
Isokawa et al.

(10) Patent No.: US 8,670,202 B2
(45) Date of Patent: Mar. 11, 2014

(54) MAGNETIC HEAD AND DISK DRIVE WITH THE SAME

(75) Inventors: Hiroshi Isokawa, Yokohama (JP); Masaya Ohtake, Ome (JP); Toshiyuki Ikai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 13/542,128

(22) Filed: Jul. 5, 2012

(65) Prior Publication Data

US 2013/0188275 A1 Jul. 25, 2013

(30) Foreign Application Priority Data

Jan. 20, 2012 (JP) .................. 2012-010318

(51) Int. Cl.
*G11B 11/105* (2006.01)
*G11B 5/02* (2006.01)

(52) U.S. Cl.
USPC .......................................... 360/59; 369/13.33

(58) Field of Classification Search
USPC ........ 369/13.33, 112.27, 13.03, 13.32, 13.13, 369/13.12; 360/59, 245.3, 69, 71, 128
See application file for complete search history.

(56) References Cited

U.S. PATENT DOCUMENTS 5,148,329 A 9/1992 Yamauchi et al.
8,077,559 B1 * 12/2011 Miyauchi et al. .......... 369/13.33

FOREIGN PATENT DOCUMENTS

JP 03-256203 A 11/1991
JP 2002-062339 A 2/2002

* cited by examiner

*Primary Examiner* — Nabil Hindi
(74) *Attorney, Agent, or Firm* — Knobbe Martens Olson & Bear LLP

(57) ABSTRACT

According to one embodiment, a magnetic head includes a main pole, a write shield pole on a trailing side of the main pole, a recording coil, and a temperature control element unit. The temperature control element unit includes a first electrode on a leading side of the main pole and on both sides of a track of the main pole, a second electrode on the leading side of the main pole and on a track center of the main pole, an N-type semiconductor and a P-type semiconductor connected to the first and second electrodes, and a wiring portion which applies a current via the second electrode, N-type semiconductor, first electrode, P-type semiconductor, and second electrode. The first and second electrodes form a heat absorbing portion and a heat radiating portion.

11 Claims, 14 Drawing Sheets

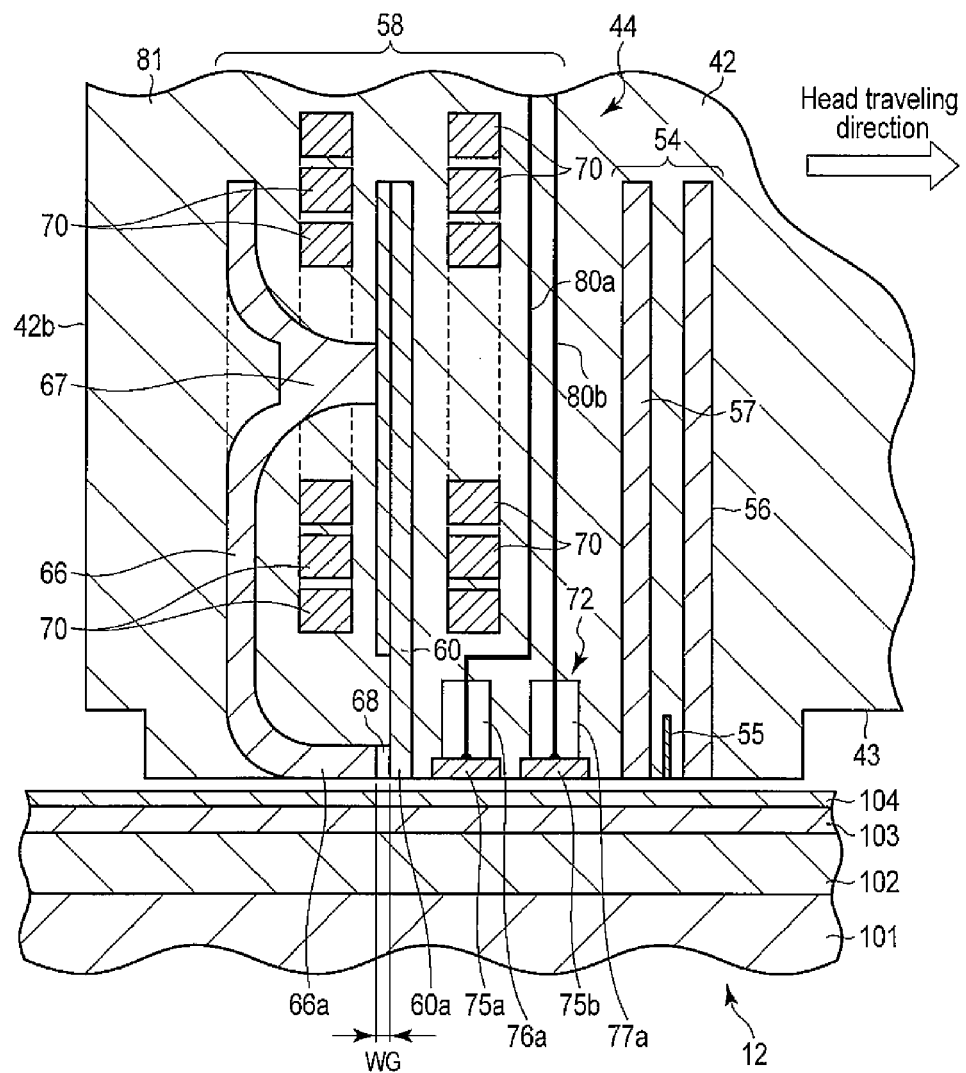
F I G. 3

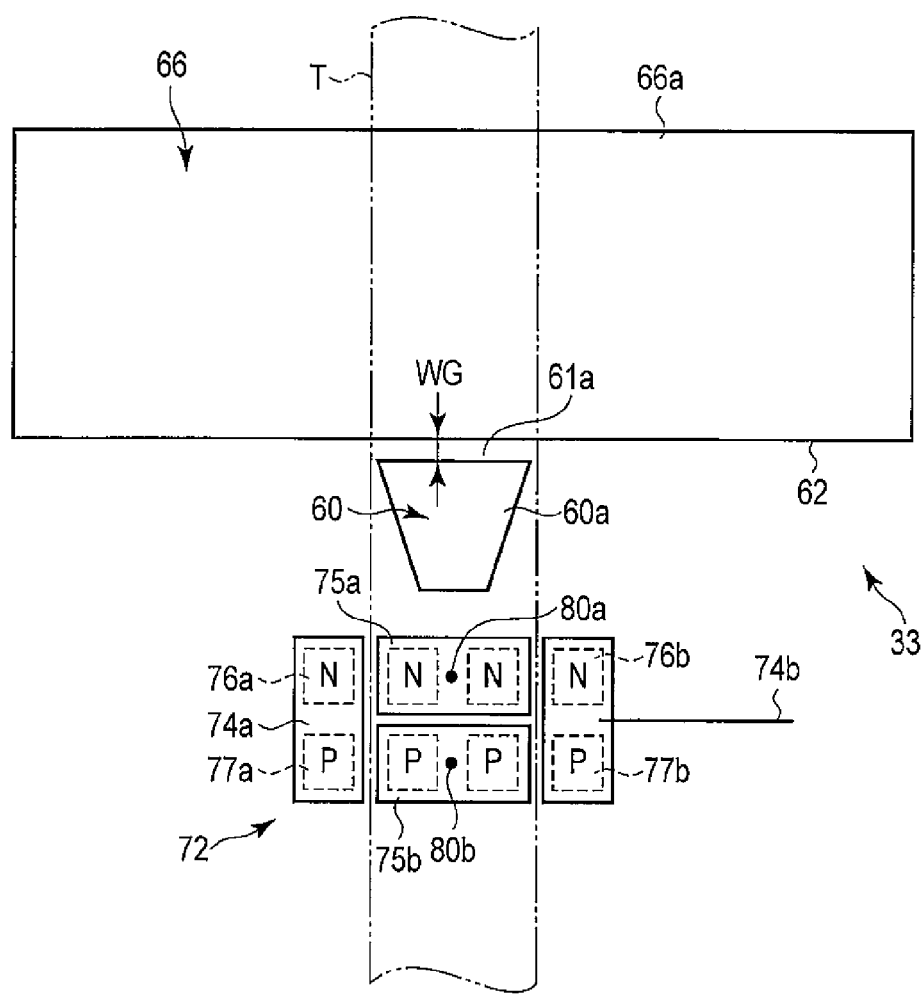
F I G. 4

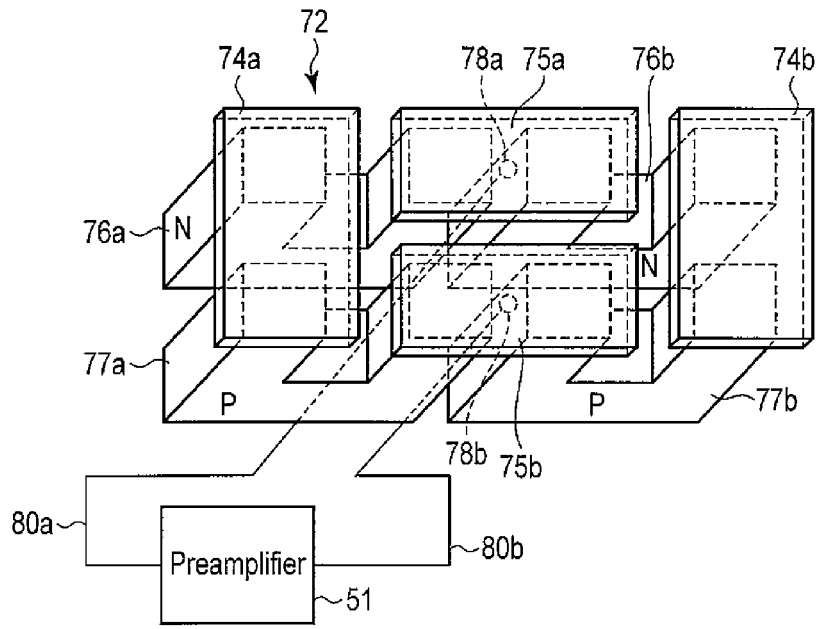
F I G. 5
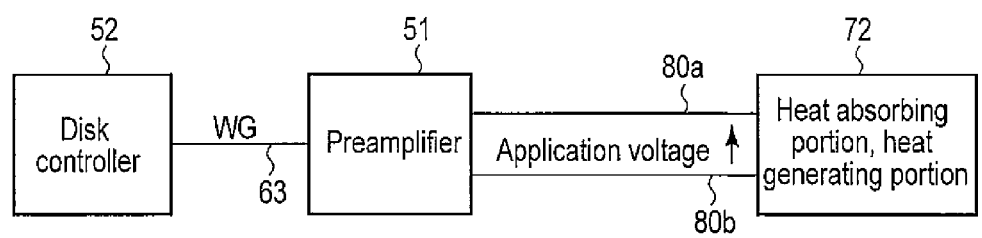
F I G. 6
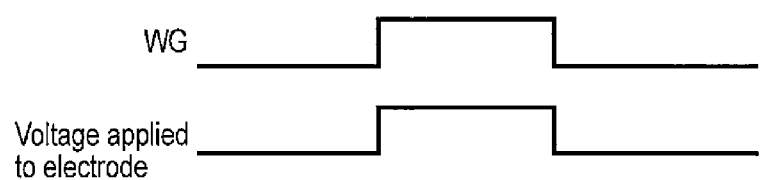
F I G. 7

Temperature characteristics of M-H loop of recording medium

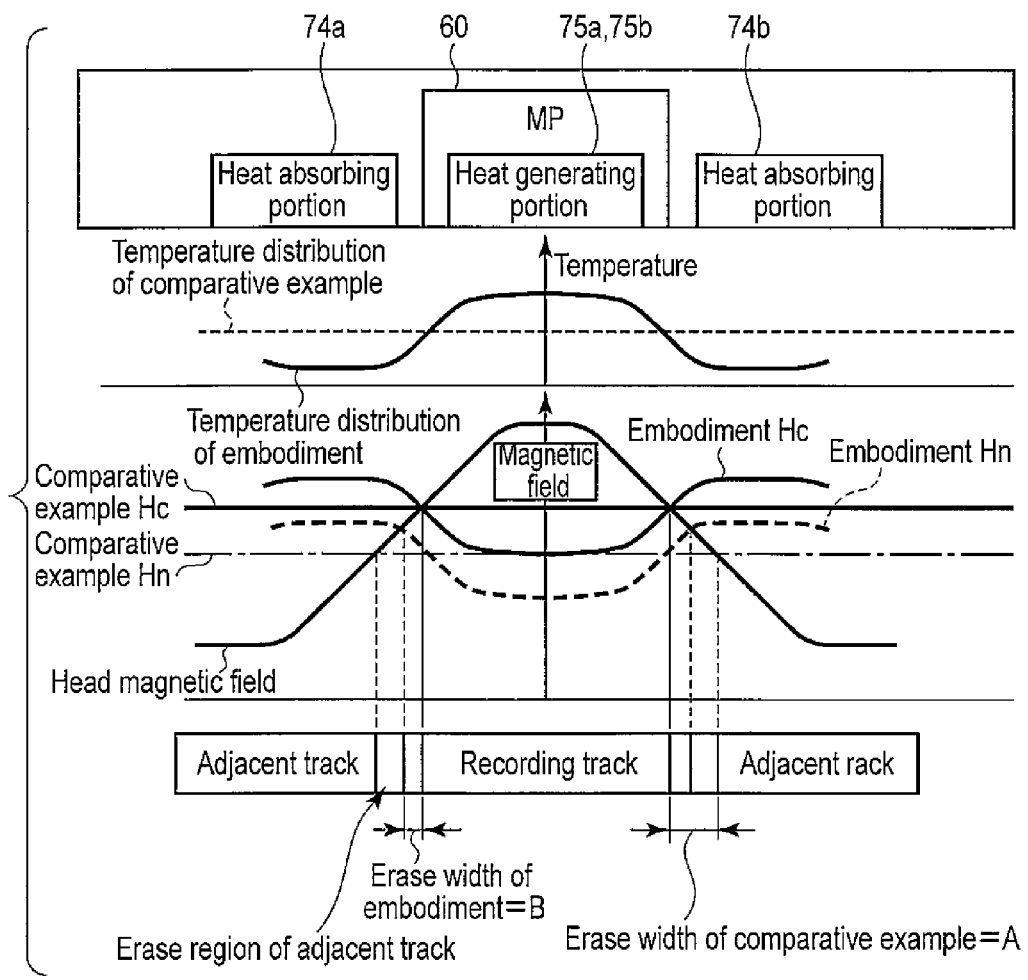
F I G. 9

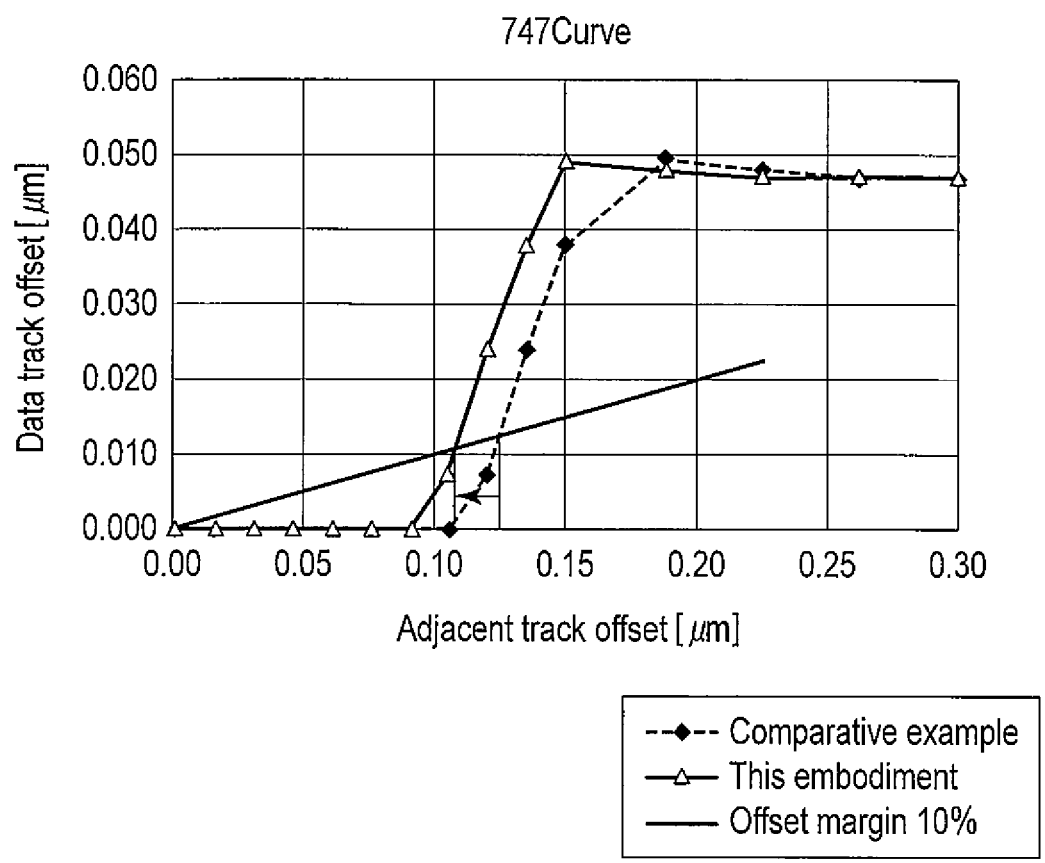
F I G. 10

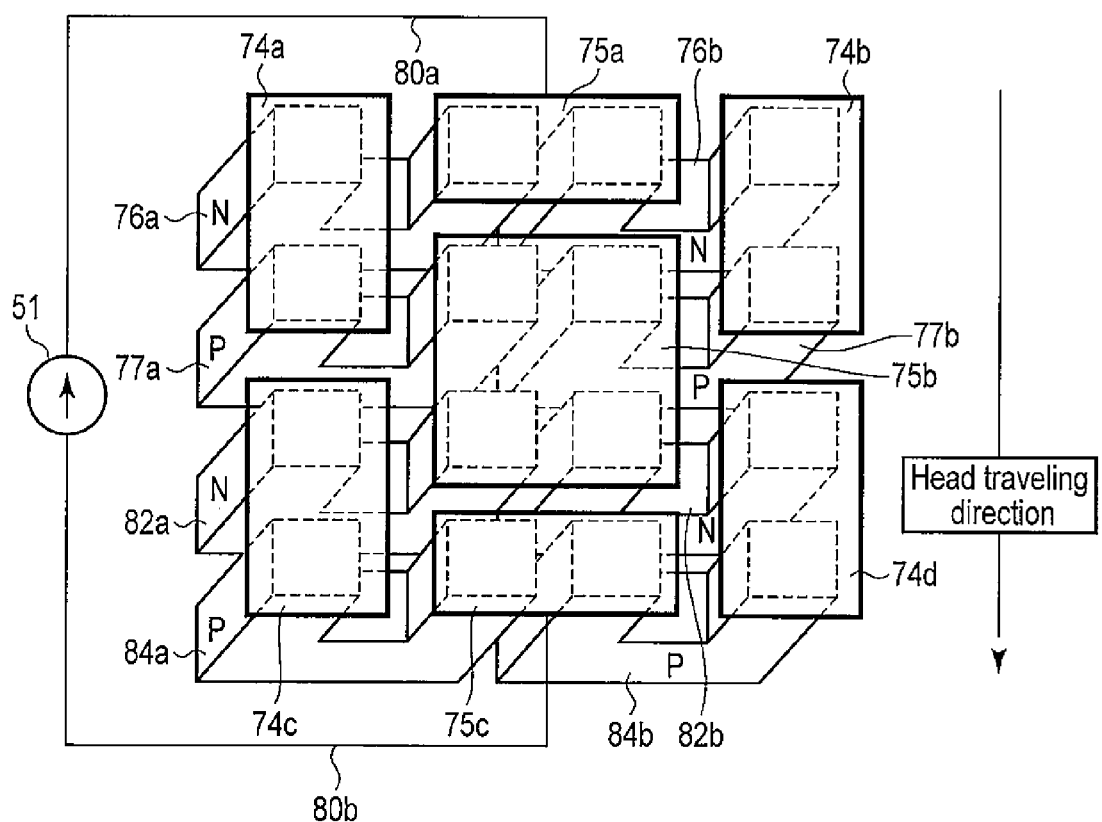
F I G. 12

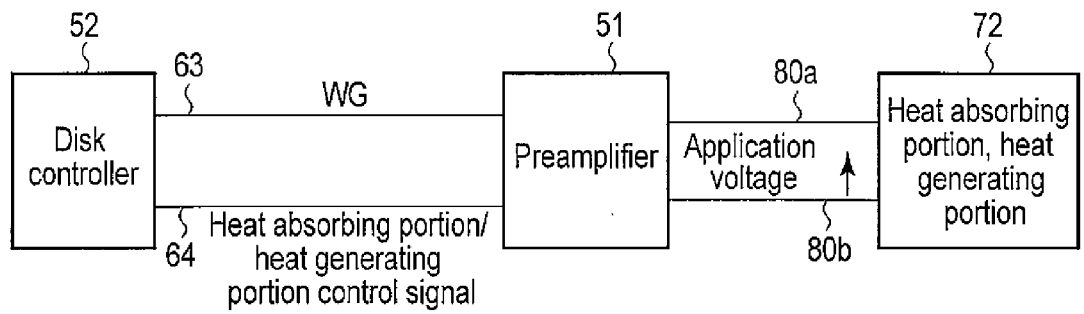
F I G. 13
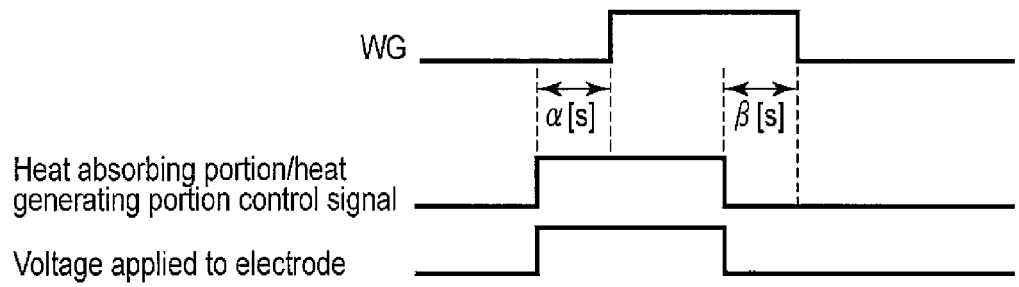
F I G. 14

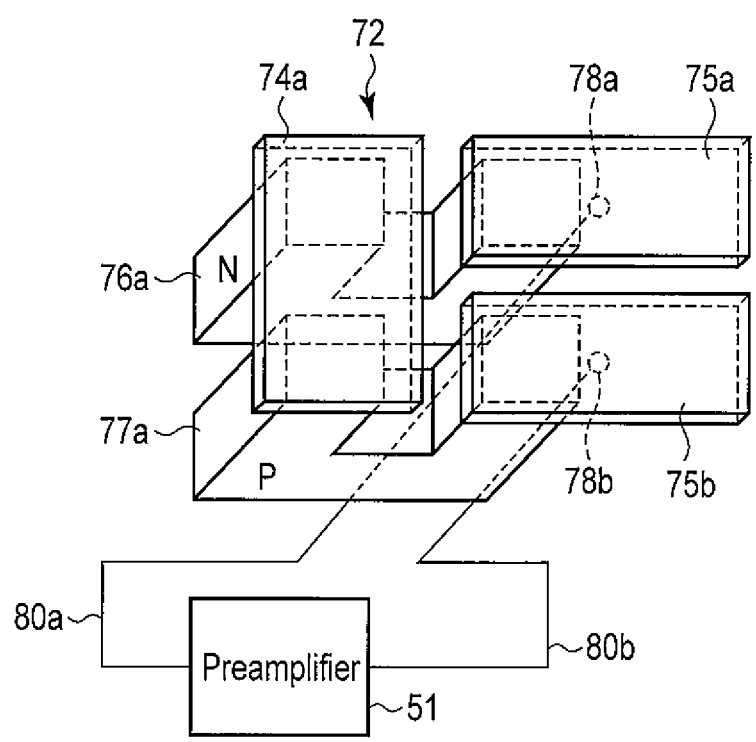
F I G. 20

MAGNETIC HEAD AND DISK DRIVE WITH THE SAME

CROSS-REFERENCE TO RELATED APPLICATIONS

This application is based upon and claims the benefit of priority from prior Japanese Patent Application No. 2012-010318, filed Jan. 20, 2012, the entire contents of which are incorporated herein by reference.

FIELD

Embodiments described herein relate generally to a magnetic head for use in a disk drive and to a disk drive provided with this magnetic head.

BACKGROUND

A disk drive, such as a magnetic disk drive, comprises a magnetic disk, a spindle motor, a magnetic head, and a carriage assembly. The magnetic disk is disposed in a case. The spindle motor supports and rotates the magnetic disk. The magnetic head reads data from and writes data to the magnetic disk. The carriage assembly supports the magnetic head for movement relative to the magnetic disk. The carriage assembly includes a rotatable arm, and a suspension extending from the arm. The magnetic head is supported on the extended end of the suspension. The magnetic head includes a slider attached to the suspension, and a head section on the slider. The head section comprises a recording head for writing and a read head for reading.

Magnetic heads for perpendicular magnetic recording have recently been proposed in order to increase the recording density and capacity of a magnetic disk drive or reduce its size. In one such magnetic head, a recording head comprises a main pole producing a perpendicular magnetic field, return or write/shield pole, and coil. The return pole is located on the trailing side of the main pole with a write gap therebetween and closes a magnetic path that leads to a magnetic disk. The coil serves to pass magnetic flux through the main pole.

When recording a recording pattern along a track of the magnetic disk, a recording magnetic field also leaks from both sides of the main pole in the track width direction. To reduce this leakage magnetic field, a magnetic head having side shields provided on both sides of the main pole in the track width direction has been suggested.

In the magnetic head having the side shields, erase width control effected by the side shields can be expected. However, when repeatedly performing the recording operation on the same track, recorded information may be erased or deteriorated in a wide region of several tens of tracks because of a return magnetic field immediately below the side shields in a magnetic flux distribution returning to the return pole from the main pole through a soft magnetic layer below a recording layer of a perpendicular recording medium.

Further, when an interval between the side shield and a side surface of the main pole is wide, there may possibly occur a phenomenon that recorded information in an adjacent track is erased or deteriorated because of magnetic flux originating from a narrowed portion of the main pole to the medium, and hence track density cannot be improved.

BRIEF DESCRIPTION OF THE DRAWINGS

FIG. 3 is a cross-sectional view showing a head unit of the magnetic head in an enlarging manner;

FIG. 4 is a plan view showing a recording head portion of the magnetic head from an ABS side of a slider;

FIG. 5 is a perspective view showing a temperature control element unit of the recording head from the ABS side of the slider;

FIG. 6 is a circuit diagram of the magnetic head;

FIG. 7 is a view showing element control timing of the magnetic head;

FIG. 9 is a view showing a change in medium characteristics in the HDD and an influence on an adjacent track at the time of center track writing according to the first embodiment;

FIG. 10 is a view showing the effect of an increase in recording density based on improvement of the track pitch of the recording head according to this embodiment;

FIG. 12 is a perspective view showing a temperature control element unit of a magnetic head according to a third embodiment from an ABS side;

FIG. 13 is a block diagram showing element connection of a magnetic head according to a fourth embodiment;

FIG. 14 is a control timing chart of the magnetic head according to the fourth embodiment;

FIG. 20 is a perspective view showing a temperature control element unit of a magnetic head according to a sixth embodiment from an ABS side.

DETAILED DESCRIPTION

Various embodiments will be described hereinafter with reference to the accompanying drawings. In general, according to one embodiment, a magnetic head includes: a main pole which applies a recording magnetic field to a recording layer of a recording medium; a write shield pole on a trailing side of the main pole with a write gap therebetween; a recording coil wound around a magnetic circuit formed of the main pole; and a temperature control element unit. The temperature control element unit includes: a first electrode arranged on a leading side of the main pole near a floating surface of the magnetic head and on each of both sides of a track of the main pole in a track width direction; a second electrode arranged on the leading side of the main pole near the floating surface and on a track center of the main pole; an N-type semiconductor and a P-type semiconductor connected to the first and second electrodes; and a wiring portion which applies a current via the second electrode, the N-type semiconductor, the first electrode, the P-type semiconductor, and the second electrode. The first electrode and the second electrode form a heat absorbing portion and a heat radiating portion.

(First Embodiment)

Figure 1:
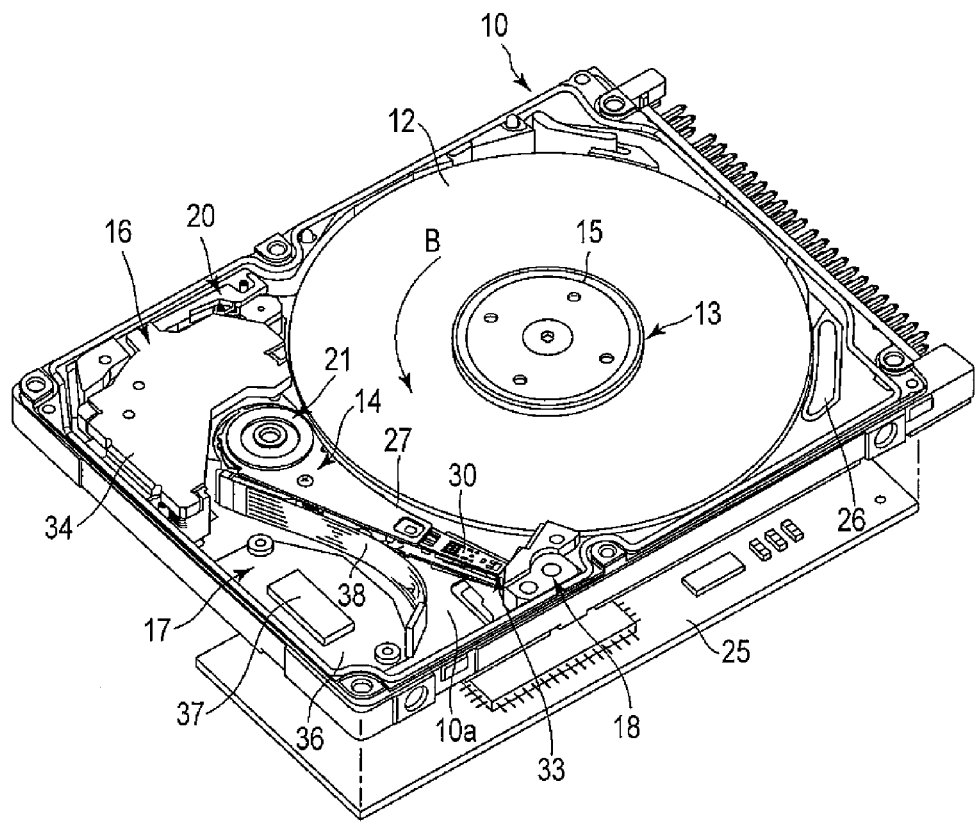
FIG. 1 is a perspective view showing a hard disk drive (which will be referred to as an HDD hereinafter) according to a first embodiment.
Figure 2:
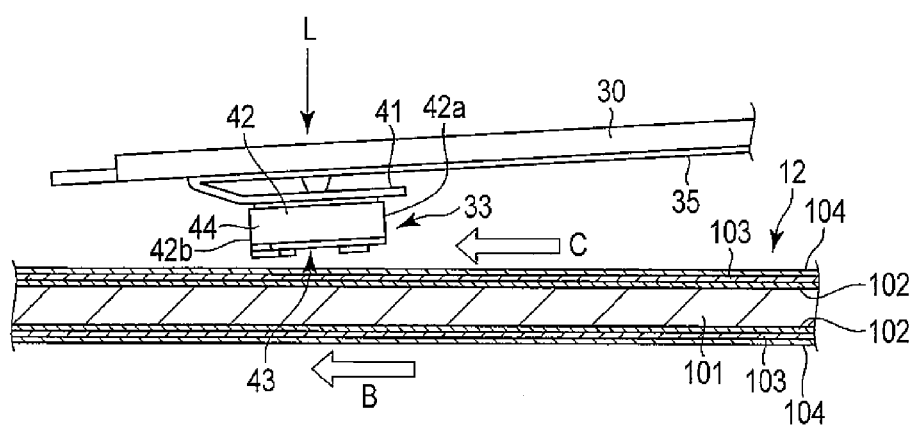
FIG. 2 is a side view showing a magnetic head and a suspension in the HDD.

FIG. 1 shows the internal structure of a hard disk drive (HDD) as a disk drive according to a first embodiment with its top cover removed, and FIG. 2 shows a flying magnetic head. As shown in FIG. 1, the HDD comprises a housing 10. The housing 10 comprises a base 10a in the form of an open-topped rectangular box and a top cover (not shown) in the form of a rectangular plate. The top cover is attached to the base by screws such that it closes the top opening of the base. Thus, the housing 10 is kept airtight inside and can be ventilated through a breather filter 26.

The base 10a carries thereon a magnetic disk 12, for use as a recording medium, and a drive section. The drive section comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record and reproduce data on and from the magnetic disk 12. The head actuator 14 supports the magnetic heads 33 for movement relative to the surfaces of the magnetic disk 12. The VCM 16 pivots and positions the head actuator. The base 11 further carries a ramp loading mechanism 18, inertial latch 20, and board unit 17. The ramp loading mechanism 18 holds the magnetic heads 33 in a position off the magnetic disk 12 when the magnetic heads are moved to the outermost periphery of the magnetic disk. The inertial latch 20 holds the head actuator 14 in a retracted position if the HDD is jolted, for example. Electronic components, such as a preamplifier, head IC, etc., are mounted on the board unit 17.

A control circuit board 25 is attached to the outer surface of the base 11 by screws such that it faces a bottom wall of the base. The circuit board 25 controls the operations of the spindle motor 13, VCM 16, and magnetic heads 33 through the board unit 17.

As described later, the control circuit board 25 comprises a first current control unit (a first current controller) for controlling the current to be applied to the magnetic head, a second current control unit (a second current controller) for controlling the current to be applied to a temperature control element unit of the magnetic head, a current control calculator for controlling the current of the first and second current control section.

As shown in FIG. 1, the magnetic disk 12 is coaxially fitted on the hub of the spindle motor 13 and clamped and secured to the hub by a clamp spring 15, which is attached to the upper end of the hub by screws. The magnetic disk 12 is rotated at a predetermined speed in the direction of arrow B by the spindle motor 13 for use as a drive motor.

The head actuator 14 comprises a bearing 21 secured to the bottom wall of the base 11 and a plurality of arms 27 extending from the bearing. The arms 27 are arranged parallel to the surfaces of the magnetic disk 12 and at predetermined intervals and extend in the same direction from the bearing 15. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each magnetic head 33 is supported on the extended end of its corresponding suspension 30. Each arm 27 and suspension 30 constitute a head suspension, and the head suspension and magnetic head 33 constitute a head suspension assembly.

As shown in FIG. 2, each magnetic head 33 comprises a substantially cuboid slider 42 and read/write head section 44 on an outflow end (trailing end) of the slider. Each magnetic head 33 is fixed to a gimbal spring 41 provided at the extended end of its corresponding suspension 30. A head load L directed to the surface of the magnetic disk 12 is applied to each magnetic head 33 by the elasticity of the suspension 30. The two arms 27 are arranged parallel to and spaced apart from each other, and the suspensions 30 and magnetic heads 33 mounted on these arms face one another with the magnetic disk 12 between them.

Each magnetic head 33 is electrically connected to a main flexible printed circuit (FPC) 38 (described later) through a relay FPC board 35 secured to the suspension 30 and arm 27.

As shown in FIG. 1, the board unit 17 comprises an FPC main body 36 formed of a flexible printed circuit board and the main FPC 38 extending from the FPC main body. The FPC main body 36 is secured to the bottom surface of the base 11. The electronic components, including a preamplifier 37 and head IC, are mounted on the FPC main body 36. An extended end of the main FPC 38 is connected to the head actuator 14 and also connected to each magnetic head 33 through each relay FPC 35.

The VCM 16 comprises a support frame (not shown) extending from the bearing 15 in the direction opposite to the arms 27 and a voice coil supported on the support frame. When the head actuator 14 is assembled to the base 11, the voice coil is located between a pair of yokes 34 that are secured to the base 11. Thus, the voice coil, along with the yokes and a magnet secured to the yokes, constitutes the VCM 16.

If the voice coil of the VCM 16 is energized with the magnetic disk 12 rotating, the head actuator 14 pivots, whereupon each magnetic head 33 is moved to and positioned on a desired track of the magnetic disk 12. As this is done, the magnetic head 33 is moved radially relative to the magnetic disk 12 between the inner and outer peripheral edges of the magnetic disk.

Configurations of the magnetic disk 12 and the magnetic head 33 will now be described in detail. FIG. 3 is an enlarged cross-sectional view showing the head portion 44 of the magnetic head 33 and the magnetic disk.

As shown in FIG. 1 to FIG. 3, the magnetic disk 12 has a board 101 which is formed into a disk shape having a diameter of, e.g., approximately 2.5 inches and made of a non-magnetic substrate. On each surface of the board 101 are laminated a soft magnetic layer 102 made of a material that exhibits soft magnetic characteristics as an underlying layer, a magnetic recording layer 103 having magnetic anisotropy in a direction perpendicular to the disk surface, and a protective film layer 104 in the mentioned order.

As shown in FIG. 2 and FIG. 3, the magnetic head 33 is constituted as a float type head and has a slider 42 formed into a substantially cuboid shape and the head portion 44 formed at an end portion of the slider on an outflow end (trailing) side. The slider 42 is formed of, e.g., a sintered compact (AlTiC) of alumina and a titanium carbide, and the head portion 44 is formed of a thin film.

The slider 42 has a rectangular disk facing surface (an air bearing surface (ABS), a floating surface) 43 facing the surface of the magnetic disk 12. The slider 42 floats by an air current C generated between the disk surface and the disk facing surface 43 because of rotation of the magnetic disk 12. A direction of the air current C coincides with a rotational direction B of the magnetic disk 12. The slider 42 is arranged with respect to the surface of the magnetic disk 12 in such a manner that a longitudinal direction of the disk facing surface 43 substantially coincides with the direction of the air current C.

The slider 42 has a leading end 42a placed on an inflow side of the air current C and a trailing end 42b placed on an outflow side of the air current C. A leading step, a trailing step, a side step, a negative pressure cavity, and others which are not shown in the drawings are formed on the disk facing surface 43 of the slider 42.

As shown in FIG. 3, the head portion 44 has a reproducing head 54 and a recording head 58 formed at the trailing end 42b of the slider 42 in a thin-film process, and it is formed as a separation type magnetic head.

The reproducing head 54 is constituted of a magnetic film 55 which exhibits the magneto-resistive effect and shield films 56 and 57 which are arranged on a trailing side and a leading side of this magnetic film to sandwich the magnetic film 55. The magnetic film 55 and lower ends of the shield films 56 and 57 are exposed on the disk facing surface 43 of the slider 42.

The recording head 58 is provided on the trailing end 42b side of the slider 42 with respect to the reproducing head 54. FIG. 4 is a plan view showing the recording head 58 from an ABS 43 side of the slider 42, and FIG. 5 is a perspective view showing a temperature control element unit of the magnetic head from the ABS 43 side.

As shown in FIG. 3 and FIG. 4, the recording head 58 has a main pole 66 made of a soft magnetic material which generates a recording magnetic field in a direction perpendicular to the surface of the magnetic disk 12 and has high magnetic permeability and high saturation flux density, a write shield pole (a return pole) 66 made of a soft magnetic material which is arranged on the trailing side of the main pole 60 with a write gap and provided to efficiently close a magnetic path through the soft magnetic layer 102 immediately below the main pole, a coupling portion 67 which couples an upper portion of the main pole 60 with the write shield pole 66, and a recording coil 70 which is arranged to wind around a magnetic path including the main pole 60 and the write shield pole 66 in order to cause magnetic flux to pass through the main pole 60 when writing a signal to the magnetic disk 12. A current supplied to the recording coil 70 is controlled by a first current control unit in the HDD.

The main pole 60 substantially vertically extends with respect to the surface of the magnetic disk 12. An end portion 60a of the main pole 60 on the magnetic disk 12 side is narrowed to taper toward the disk surface. The end portion 60a of the main pole 60 has a cross section formed into, e.g., a trapezoidal shape, and it has a trailing side end surface 61a with a predetermined width placed on a trailing end side, a leading side end surface which faces the trailing end surface and has a width narrower than that of the trailing side end surface, and both side surfaces. An end surface of the main pole 60 is exposed on the disk facing surface 43 of the slider 42. The width of the trailing side end surface 61a substantially corresponds to a width of the track of the magnetic disk 12.

The write shield pole 66 is formed into a substantially L-like shape, and its end portion 66a is formed into an elongated rectangular shape. An end surface of the write shield pole 66 is exposed on the ABS 43 of the slider 42. A leading side end surface 62 of the end portion 66a extends along the width direction of each track of the magnetic disk 12. This leading side end surface faces the trailing side end surface 61a of the main pole 60 in parallel to interpose a write gap WG therebetween.

As shown in FIG. 3, the reproducing head 54 and the recording head 58 are covered with a protective insulating film 81 except portions exposed on the disk facing surface 43 of the slider 42. The protective insulating film 81 constitutes an outer shape of the head portion 44.

As shown in FIG. 3 to FIG. 5, the head portion 44 of the magnetic head 33 has a temperature control element unit 72 which has heat radiating portions and heat absorbing portions. That is, the temperature control element unit 72 comprises two rectangular plate-like first electrodes 74a and 74b forming the heat absorbing portions, two rectangular plate-like second electrodes 75a and 75b forming the heat radiating portions, N-type semiconductors 76a and 76b and P-type semiconductors 77a and 77b connected to these electrodes, terminals 78a and 78b connected to the second electrodes 75a and 75b, and wiring lines 80a and 80b connected to cause a current to flow between these terminals 78a and 78b. Further, as shown in FIG. 6, the HDD comprises a disk controller 52 having a voltage supply source and a preamplifier 51 connected to this disk controller, and the preamplifier is connected to the terminals 78a and 78b through the wiring lines 80a and 80b to apply a voltage to the second electrodes 75a and 75b.

As shown in FIG. 3 to FIG. 5, the two first electrodes 74a and 74b forming the heat absorbing portions are arranged exposed to both sides of a track T of the main pole and the vicinity of the ABS 43 or the ABS 43 of the slider on the leading side of the main pole 60. The two second electrodes 75a and 75b forming the heat radiating portions are arranged overlapping a track T center of the main pole and exposed to the vicinity of the ABS 43 or the ABS on the leading side of the main pole 60. The second electrodes 75a and 75b are aligned to interpose a small gap therebetween in the track direction and placed between the two first electrodes 74a and 74b. Moreover, the second electrodes 75a and 75b are provided over a width substantially equal to a width of the track T, i.e., a width of the end portion of the main pole 60.

The N-type semiconductor 76a is provided on the opposite side of the ABS 43 with respect to the electrodes and connected to the first electrode 74a and the second electrode 75a. The P-type semiconductor 77a is provided on the opposite side of the ABS 43 with respect to the electrodes and connected to the first electrode 74a and the second electrode 75b. The N-type semiconductor 76b is provided on the opposite side of the ABS 43 with respect to the electrodes and connected to the first electrode 74b and the second electrode 75a. The P-type semiconductor 77b is provided on the opposite side of the ABS 43 with respect to the electrodes and connected to the first electrode 74b and the second electrode 75b.

As shown in FIG. 6 and FIG. 7, the timing of writing data to the magnetic disk 12 is controlled by a write gate (WG) signal 63 as a data write signal from the disk controller 52 functioning as a first current control unit (a first current controller) and a second current control unit (a second current controller), and a signal is written to a recording layer in the magnetic disk 12 by the main pole 60 while the WG signal 63 is active (high). The preamplifier 51 supplies a voltage to the temperature control element unit 72 having the first and second electrodes 74a to 76b, the N-type semiconductors 76a and 76b, and the P-type semiconductors 77a and 77b at the same time while the WG signal 63 is active so that a current can flow through the second electrode 75, the N-type semiconductors 76a and 76b, the first electrodes 74a and 74b, the P-type semiconductors 77a and 77b, and the second electrode 75b in the mentioned order.

Figure 8:
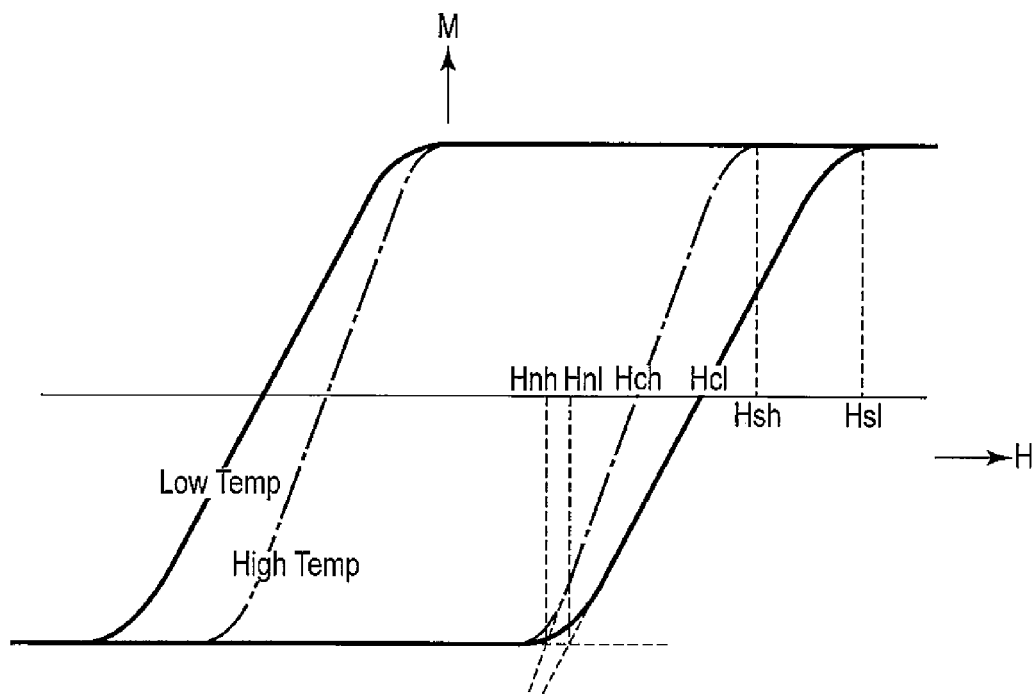
FIG. 8 is a view showing temperature dependence of magnetic characteristics of a magnetic disk.

When the current is caused to flow in this manner, the heat absorbing portions that produce a heat absorbing effect function immediately below the first electrodes 74a and 74b and the heat generating portion that produces a heat generating effect functions immediately below the second electrodes 75a and 75b at the time of writing with the main pole 60. A temperature is lowered in the heat absorbing portion, and a temperature is increased in the heat radiating portion. Therefore, as shown in FIG. 8 and FIG. 9, since a temperature of the recording layer in the magnetic disk 12 is reduced by the heat absorbing portion at a track edge of the main pole 60, i.e., each of both sides of the track T in the width direction, coercive force Hc of the recording layer and a reversed magnetic field Hn are increased and data is hard to be written. Conversely, since the temperature of the recording layer in the magnetic disk 12 is increased by the heat radiating portions of the temperature control element unit 72 on a traveling portion of the main pole 60, i.e., the write track T, the coercive force Hc of the recording layer and the reversed magnetic field Hn are reduced and data can be easily written. As a result, writing into an adjacent track and deterioration of information can be avoided while writing information into the recording track using the main pole 60. As described above, a temperature distribution on the track of the magnetic disk 12 can be controlled, and an erase region of the track edge of the main pole 60 can be narrowed.

FIG. 10 is a view showing comparison of a data track offset to an adjacent track offset in regard to the magnetic head 33 according to this embodiment and a magnetic head according to a comparative example having no temperature control element unit. This drawing illustrates that the magnetic head according to this embodiment can increase the track density as an index that determines recording density as compared with the comparative example. This effect enables the recording density of the magnetic disk to be increased.

According to the thus configured HDD, when the VCM 16 is driven, the head actuator 14 rotationally moves, and the magnetic head 33 is moved onto and positioned on a desired track of the magnetic disk 12. Furthermore, the magnetic head 33 floats by an air current C generated between the disk surface and the disk facing surface 43 by the rotation of the magnetic disk 12. At the time of operations of the HDD, the disk facing surface 43 of the slider 42 faces the disk surface while keeping a gap therebetween. As shown in FIG. 2, the magnetic head 33 floats in an inclined posture that enables the closet approach of the recording head 58 portion of the head portion 44 to the surface of the magnetic disk 12. In this state, the reproducing head 54 is used to read recorded information from the magnetic disk 12, and the recording head 58 is used to write information into the magnetic disk 12.

In writing of information, the recording coil 70 excites the main pole 60 to apply a perpendicular recording magnetic field to the recording layer 103 in the magnetic disk 12 provided immediately below from this main pole, thereby recording the information with a desired track width. At this time, when a desired voltage is applied to the temperature control element unit 72 of the magnetic head 33, a temperature in regions on both sides of a write track is lowered by the heat absorbing portion and a temperature in the write track is increased by the heat radiating portion at the same time. As a result, deterioration or erasing of recorded information can be suppressed at a position of an adjacent track apart from a recording track while writing information into the recording track by the main pole 60. An erase width of the adjacent track can be decreased, and the track pitch can be narrowed. Therefore, the track density of the recording layer in the magnetic disk 12 can be increased, and the recording density of the HDD can be improved.

An HDD according to another embodiment will now be described.

In another embodiment explained below, reference numerals equal to those in the first embodiment denote parts equal to those in the first embodiment to omit a detailed description thereof.

(Second Embodiment)

Figure 11:
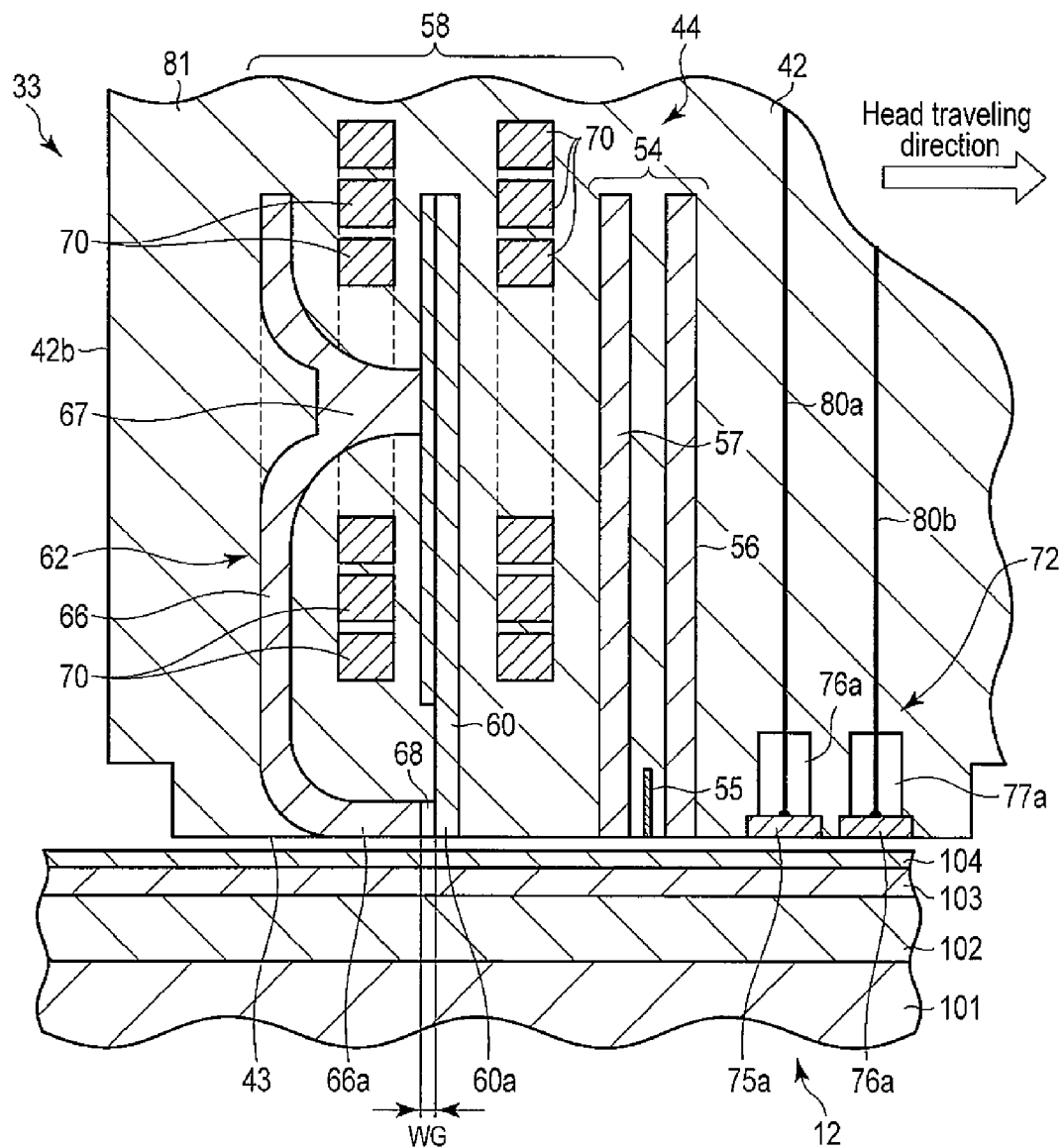
FIG. 11 is an enlarged cross-sectional view showing a head portion of a magnetic head in an HDD according to a second embodiment.

FIG. 11 shows a head portion of a magnetic head of an HDD according to a second embodiment in an enlarging manner. As shown in this drawing, according to the second embodiment, first electrodes 74a and 74b, second electrodes 75a and 75b, N-type semiconductors 76a and 76b, P-type semiconductors 77a and 77b, and wiring lines 80a and 80b constituting a temperature control element unit 72 of the magnetic head are arranged on a leading side of reproducing head 54 for reading. The arrangement of the first and second electrodes 74a, 74b, 75a, and 75b with respect to a recording track of a magnetic disk is the same as that in the first embodiment.

In this configuration, the electrodes and the semiconductors are not sandwiched between a main pole 60 and the reproducing head 54, a restriction on a volume of the temperature control element unit 72 can be reduced, and volumes of the first and second electrodes 74a, 74b, 75a, and 75b, the N-type semiconductors 76a and 76b, and the P-type semiconductors 77a and 77b can be increased. Therefore, the track pitch reducing effect can be enhanced because of an increase in the heat absorbing effect and heat radiating effect of the electrodes. Moreover, before a recording head 58 moves to a write position, a write position of a recording layer 103 in a magnetic disk 12 can be heated and heat in an adjacent track can be absorbed in advance to lower a temperature. As a result, information can be further assuredly written.

(Third Embodiment)

FIG. 12 shows a temperature control element unit 72 in a magnetic head of an HDD according to a third embodiment. According to this embodiment, the second electrode 75b of the temperature control element unit 72 described in the first and second embodiments is expanded and formed on the leading side of the magnetic head 33. The temperature control element unit 72 further has a second electrode 75c which is arranged on a leading side of the second electrode 75b to interpose a gap therebetween and placed at a track center and first electrodes 74c and 74d placed on both sides of a recording track and on both sides of the second electrodes 75b and 75c to interpose gaps therebetween. The first electrodes 74c and 74d are aligned along a track direction to interpose gaps between the first electrodes 74a and 74b and themselves, respectively.

An N-type semiconductor 82a is provided on the opposite side of an ABS 43 with respect to the electrodes and connected to the first electrode 74c and the second electrode 75b. A P-type semiconductor 84a is provided on the opposite side of the ABS 43 with respect to the electrodes and connected to the first electrode 74c and the second electrode 75c. An N-type semiconductor 82b is provided on the opposite side of the ABS 43 with respect to the electrodes and connected to the first electrode 74d and the second electrode 75b. A P-type semiconductor 84b is provided on the opposite side of the ABS 43 with respect to the electrodes and connected to the first electrode 74d and the second electrode 75c. The second electrodes 75a and 75c are connected to a preamplifier 51 through wiring lines 80a and 80b.

The preamplifier 51 supplies a voltage to the temperature control element unit 72 while a WG signal from a disk controller is active so that a current can flow through the second electrode 75a, the N-type semiconductors 76a and 76b, the first electrodes 74a and 74b, the P-type semiconductors 77a and 77b, the second electrode 75b, the N-type semiconductors 82a and 82b, the first electrodes 74c and 74d, the P-type semiconductors 84a and 84b, and the second electrode 75c in the mentioned order.

When the current is caused to flow in this manner, at the time of writing with the main pole 60, the first electrodes 74a and 74b and the first electrodes 74c and 74d function as heat absorbing portions that produce a heat absorbing effect, and the second electrodes 75a and 75b and the second electrodes 75b and 75c function as heat radiating portions that produce a heat generating effect. A temperature is lowered in the heat absorbing portions, and a temperature is increased in the heat radiating portion.

As described above, according to this embodiment, the temperature control element unit 72 can constitute the heat absorbing portions to enhance the heat absorbing effect, whereby the effect of reducing the track pitch can be increased.

(Fourth Embodiment)

FIG. 13 and FIG. 14 show a control circuit and a timing chart of signal output of an HDD according to a fourth embodiment. The temperature control element unit 72 described in the first, second, and third embodiments is connected to a preamplifier 51 through wiring lines 80a and 80b, and this preamplifier is connected to a disk controller 52. Additionally, the disk controller 52 has a function of outputting an element control signal 64 to the preamplifier 51 and applying a voltage to the temperature control element unit 72 in asynchronous to a write gate signal 63.

According to this configuration, a heat absorbing operation can be performed asynchronously with respect to the write gate signal 63, the width for erasing an adjacent track can be controlled, and the effect of reducing the track pitch can be enhanced.

(Fifth Embodiment)

Figure 15:
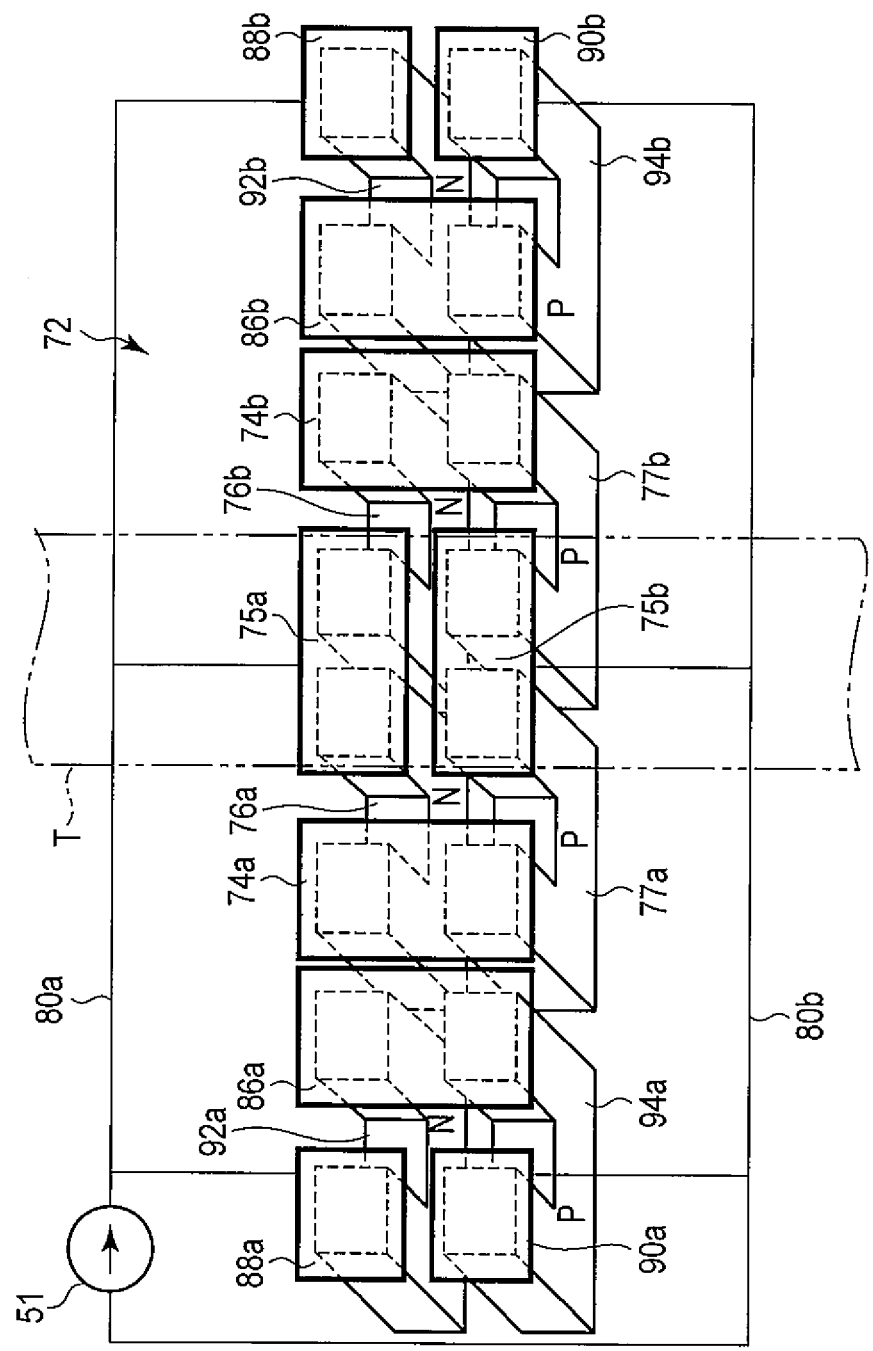
FIG. 15 is a perspective view showing a temperature control element unit of a magnetic head according to a fifth embodiment from an ABS side.
Figure 16:
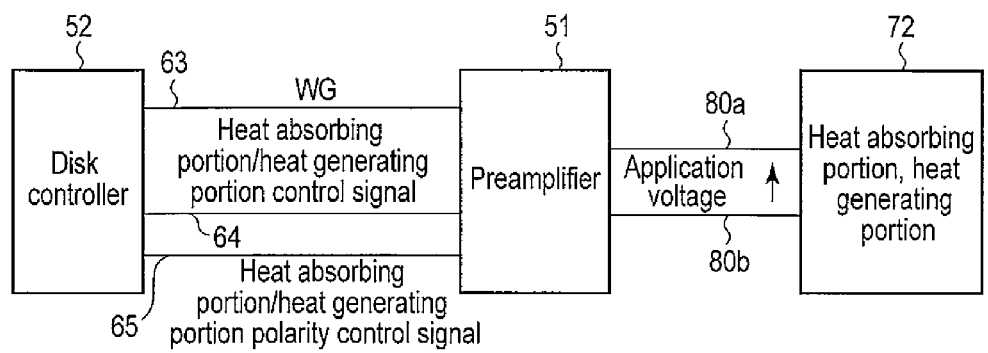
FIG. 16 is a block diagram showing element connection of the magnetic head according to the fifth embodiment.
Figure 17:
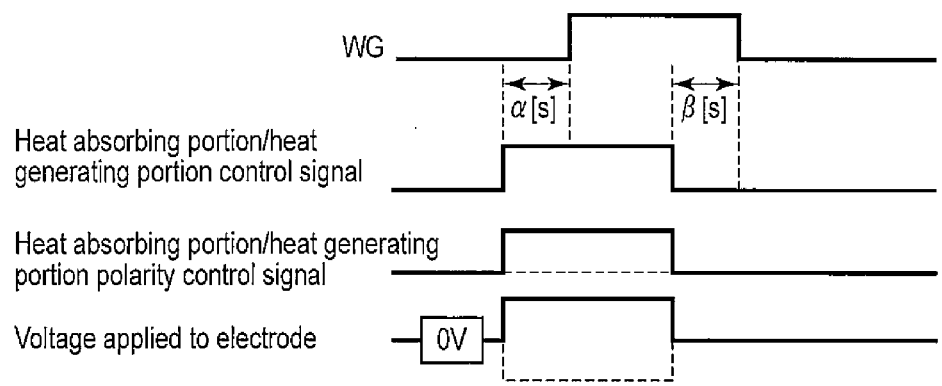
FIG. 17 is a control timing chart of the magnetic head according to the fifth embodiment.

FIG. 15 is a perspective view schematically showing arrangement of a temperature control element unit 72 of a magnetic head in an HDD according to a fifth embodiment, FIG. 16 is a connection block diagram showing a disk controller 52, a preamplifier 51, and the temperature control element unit in the fifth embodiment, and FIG. 17 is a voltage application timing chart.

As shown in FIG. 15, like the first, second, and third embodiments, the temperature control element unit 72 of the magnetic head comprises first electrodes 74a and 74b forming heat absorbing portions, second electrodes 75a and 75b forming heat radiating portions, N-type semiconductors 76a and 76b that connect the first electrode and the second electrode, and P-type semiconductors 77a and 77b, and it also comprises third electrodes 86a and 86b which are arranged on both sides of the first electrode and the second electrode, namely, aligned in a track width direction to form heat absorbing portions, and fourth electrodes 88a and 88b and fifth electrodes 90a and 90b which are arranged on the outer sides of the third electrodes to form heat radiating portions.

The third electrode 86a is formed into a shape of substantially the same size as the first electrode 74a and arranged on the outer side of the first electrode 74a in the track width direction to interpose a gap therebetween. The third electrode 86b is formed into a shape of substantially the same size as the first electrode 74b and arranged on the outer side of the first electrode 74b in the track width direction to interpose a gap therebetween.

Each of the fourth electrode 88a and the fifth electrode 90a is formed into a size which is substantially half of the second electrode 75a and arranged on the outer side of the third electrode 86a in the track width direction to interpose a gap therebetween. Each of the fourth electrode 88b and the fifth electrode 90b is formed into a size which is substantially half of the second electrode 75b and arranged on the outer side of the third electrode 86b in the track width direction to interpose a gap therebetween.

The temperature control element unit 72 further comprises an N-type semiconductor element 92a that is provided on the opposite side of an ABS of a magnetic head with respect to the electrodes and connects the third electrode 86a and the fourth electrode 88a, an N-type semiconductor element 92b that connects the third electrode 86b and the fourth electrode 88b, a P-type semiconductor element 94a that is provided on the opposite side of the ABS of the magnetic head with respect to the electrodes and connects the third electrode 86a and the fifth electrode 90a, and a P-type semiconductor element 94b that connects the third electrode 86b and the fifth electrode 90b.

The second electrode 75a and the fourth electrodes 88a and 88b are connected to the preamplifier 51 through a wiring line 80a, and the second electrode 75b and the fifth electrodes 90a and 90b are connected to the preamplifier 51 through a wiring line 80b.

As shown in FIG. 16, in the fifth embodiment, the disk controller 52 has a function of controlling operations of the temperature control element unit 72 using a polarity control signal 65 in accordance with a skew angle of the magnetic head. That is, a polarity of an application voltage that is applied to the temperature control element unit 72 from the preamplifier 51 is controlled using the polarity control signal 65, and the polarity of the application voltage is reversed in accordance with a screw angle of the magnetic head to countercharge the heat absorbing portions and the heat radiating portions.

Figure 18:
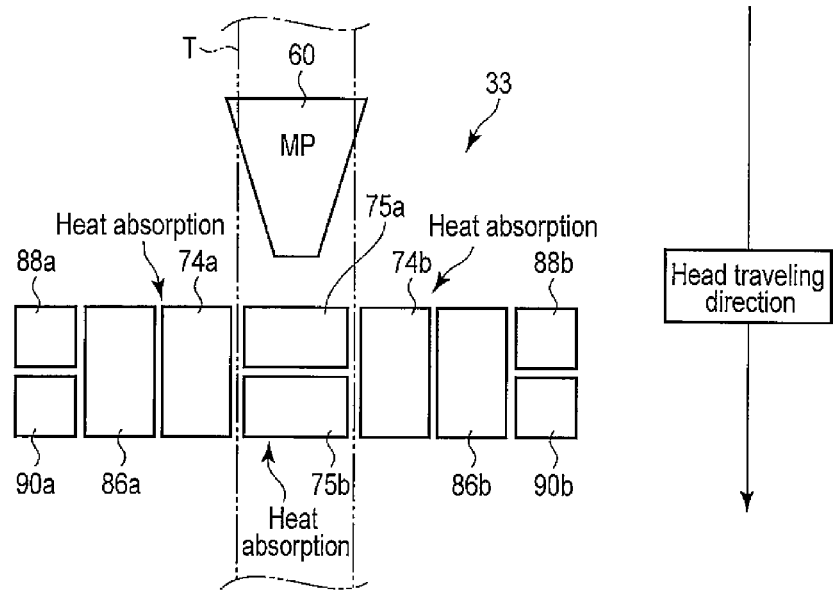
FIG. 18 is a view showing an operation example (a skew angle=small) of the magnetic head according to the fifth embodiment.
Figure 19:
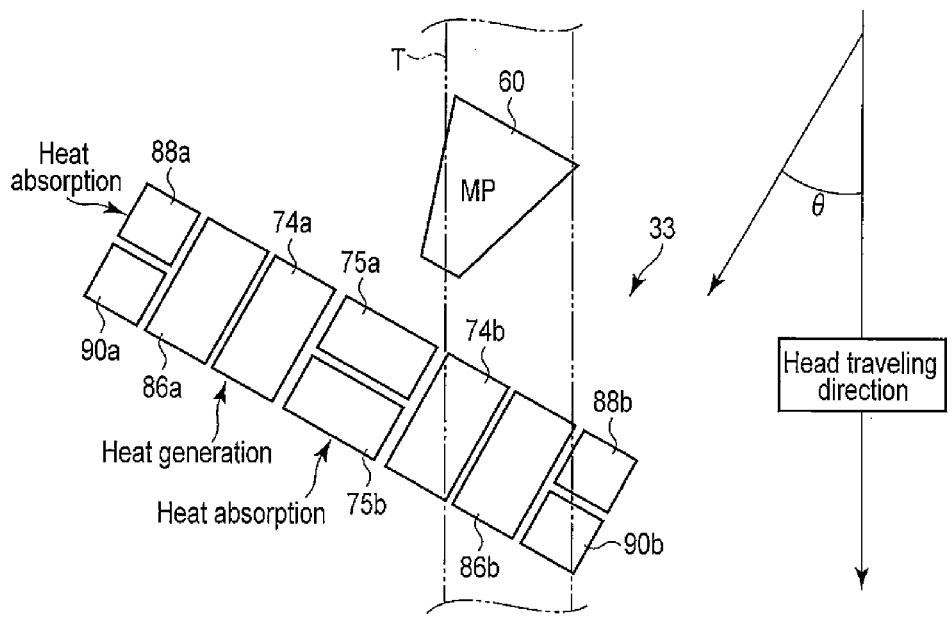
FIG. 19 is a view showing another operation example (a skew angle=large) of the magnetic head according to the fifth embodiment.

FIG. 18 and FIG. 19 show functions of the magnetic head and the temperature control element unit 72 according to the fifth embodiment. The disk controller 52 sets the heat radiating portions and the heat absorbing portions that fit to a position of the main pole 60, i.e., a position of the recording track T by determining a skew angle $\theta$ of the magnetic head 33 at the time of writing data and controlling the polarity control signal 65 in accordance with the skew signal, whereby the effect of reducing the track pitch can be enhanced by performing temperature control.

FIG. 18 shows a case that the skew angle $\theta$ is small, i.e., a case that the magnetic head 33 is placed near an intermediate periphery of the magnetic disk, and the disk controller 52 determines that the skew angle is small, makes the polarity control signal 65 high, and also determines the application voltage as positive to perform operations. As a result, the first electrodes 74a and 74b function as the heat absorbing portions and the second electrodes 75a and 75b function as the heat radiating portions so that heat on both sides of the recording track T is absorbed and a recording track center portion is heated to increase its temperature.

As shown in FIG. 19, when the magnetic head 33 is placed on the outer peripheral side or the inner peripheral side of the magnetic disk and the skew angle ($\theta$) (e.g., ±15°) of the magnetic head is large, the second electrodes 75a and 75b forming the heat radiating portions are placed while deviating from the center of the recording track T to the outer side of the track. Therefore, when the disk controller 52 determines that the skew angle $\theta$ is large (e.g., not lower than ±10°), it makes the polarity control signal 65 low and determines the application voltage to the temperature control element unit 72 as negative to perform operations. As a result, the first electrodes 74a and 74b and the third electrodes 86a and 86b operate as the heat radiating portions, and the second electrodes 75a and 75b and the fourth and fifth electrodes 88a, 88b, 90a, and 90b function as the heat absorbing portions, respectively. Therefore, even if the skew angle θ is large, the heat radiating portions are placed on the center of the recording track T, and the heat absorbing portions are placed on each of the both sides of the side edges of the recoding track T.

Therefore, according to the fifth embodiment, the heat radiating portion and the heat absorbing portion that fit to a position of the recording track T can be set in accordance with the skew angle θ of the magnetic head 33 at the time of writing data, whereby the effect of reducing the track pitch can be enhanced. As a result, even if the skew angle of the magnetic head 33 fluctuates, deterioration or erasing of recorded information in an adjacent track region can be avoided, thereby obtaining the magnetic head enabling high recording density and the disk drive equipped with this magnetic head.

(Sixth Embodiment)

FIG. 20 shows a temperature control element unit 72 in a magnetic head of an HDD according to a sixth embodiment. According to this embodiment, a first electrode 74*a* forming a heat absorbing portion is provided on only one side of a recording track. That is, the temperature control element unit 72 comprises one rectangular plate-like first electrode 74*a* forming a heat absorbing portion, two rectangular plate-like second electrodes 75*a* and 75*b* forming heat radiating portions, an N-type semiconductor 76*a* and a P-type semiconductor 77*a* connected to these electrodes, and wiring lines 80*a* and 80*b* which are connected to the second electrodes 75*a* and 75*b* through terminals 78*a* and 78*b* and configured to cause a current to flow through these terminals 78*a* and 78*b*. The HDD comprises a disk controller 52 having a voltage supply source and a preamplifier 51 connected to this disk controller, and the preamplifier is connected to the terminals 78*a* and 78*b* through the wiring lines 80*a* and 80*b* to apply a voltage to the second electrodes 75*a* and 75*b*.

The first electrode 74*a* forming the heat absorbing portion is arranged exposed to one side of a track T of a main pole and the vicinity of an ABS or the ABS of a slider on a leading side of a main pole. The two second electrodes 75*a* and 75*b* forming the heat radiating portions are arranged overlapping a track T center of the main pole and exposed to the vicinity of the ABS or the ABS on the leading side of the main pole. The second electrodes 75*a* and 75*b* are aligned to interpose a slight gap therebetween in a track direction. The second electrodes 75*a* and 75*b* are provided over a width of the track T, i.e., a width substantially equal to a width of an end portion of the main pole.

The N-type semiconductor 76*a* is provided on the opposite side of the ABS with respect to the electrodes and connected to the first electrode 74*a* and the second electrode 75*a*. The P-type semiconductor 77*a* is provided on the opposite side of the ABS with respect to the electrodes and connected to the first electrode 74*a* and the second electrode 75*b*.

A preamplifier 51 applies a voltage to the temperature control element unit 72 while a WG signal fed from the disk controller is active so that a current can flow through the second electrode 75*a*, the N-type semiconductor 76*a*, the first electrode 74*a*, the P-type semiconductor 77*a*, and the second electrode 75*b* in the mentioned order. When the current is caused to flow in this manner, at the time of writing by using the main pole, the first electrode 74*a* functions as the heat absorbing portion that produces the heat absorbing effect and the second electrodes 75*a* and 75*b* function as the heat radiating portions that produce the heat generating effect. A temperature is reduced in the heat absorbing portion, and a temperature is increased in the heat radiating portion.

In this manner, according to this embodiment, the heat absorbing portions can be constituted by using the temperature control element unit 72 to enhance the heat absorbing effect, and the effect of reducing the track pitch can be increased. For example, in an HDD in which a recording layer in a magnetic disk is overwritten with information, even if the heat absorbing portion is provided on only one side of a track, the same functions and effects as those of the first embodiment can be obtained.

As described above, according to the first to sixth embodiments, deterioration or erasing of recorded information in an adjacent track region can be avoided, and the magnetic head that enables high recording density and the disk drive provided with this magnetic head can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, materials, shapes, sizes, and others of elements constituting the head portion can be changed as required. Sizes and shapes of the electrodes constituting the temperature control element unit can be changed as required. The recording head of the magnetic head may include side shields provided on both sides of the main pole. Further, in the magnetic disk drive, the numbers of magnetic disks and magnetic heads can be increased as required, and various sizes can be selected for the magnetic disk.

What is claimed is:

1. A magnetic head comprising:
a main pole configured to apply a recording magnetic field to a recording layer of a recording medium;
a write shield pole on a trailing side of the main pole with a write gap therebetween;
a recording coil configured to wind around a magnetic circuit formed of the main pole; and
a temperature control element unit comprising: a first electrode on a leading side of the main pole near a floating surface of the magnetic head and on both sides of a track of the main pole in a track width direction; a second electrode on the leading side of the main pole near the floating surface and on a track center of the main pole; an N-type semiconductor and a P-type semiconductor connected to the first and second electrodes; and a wiring portion configured to apply a current through the second electrode, the N-type semiconductor, the first electrode, and the P-type semiconductor, wherein the first electrode and the second electrode are configured to form a heat absorbing portion and a heat radiating portion.

2. The magnetic head of claim 1, wherein the temperature control element unit further comprises two second electrodes on the track center in a track direction and two first electrodes on both outer sides of the main pole apart from track edges, wherein the N-type semiconductor is connected to a portion between one of the first electrodes and one of the second electrodes and a portion between the other first electrode and the one of the second electrodes, and the P-type semiconductor is connected to a portion between the one of the first electrodes and the other second electrode and between the other first electrode and the other second electrode.

3. The magnetic head of claim 2, further comprising a reproducing head on the leading side of the main pole, wherein the temperature control element unit is on a leading side of the reproducing head.

4. The magnetic head of claim 3, wherein the temperature control element unit further comprises a third electrode on an outer side of the first electrodes in the track width direction of the track of the main pole, a fourth electrode and a fifth electrode provided on outer sides of the third electrode in the track width direction, an N-type semiconductor connects the third electrode and the fourth electrode, a P-type semiconductor connects the third electrode and the fifth electrode, and a wiring portion configured to apply a current through the fourth electrode, the N-type semiconductor, the third electrode, the P-type semiconductor, and the fifth electrode, wherein the third electrode and the fourth and fifth electrodes are configured to form a heat absorbing portion and heat radiating portions.

5. The magnetic head of claim 1, further comprising a reproducing head on the leading side of the main pole, wherein the temperature control element unit is on a leading side of the reproducing head.

6. The magnetic head of claim 1, wherein the temperature control element unit further comprises a third electrode on an outer side of the first electrodes in the track width direction of the track of the main pole, a fourth electrode and a fifth electrode provided on outer sides of the third electrode in the track width direction, an N-type semiconductor connects the third electrode and the fourth electrode, a P-type semiconductor connects the third electrode and the fifth electrode, and a wiring portion configured to apply a current through the fourth electrode, the N-type semiconductor, the third electrode, the P-type semiconductor, and the fifth electrode, wherein the third electrode and the fourth and fifth electrodes are configured to form a heat absorbing portion and heat radiating portions.

7. The magnetic head of claim 2, wherein the temperature control element unit further comprises a third electrode on an outer side of the first electrodes in the track width direction of the track of the main pole, a fourth electrode and a fifth electrode provided on outer sides of the third electrode in the track width direction, an N-type semiconductor connects the third electrode and the fourth electrode, a P-type semiconductor connects the third electrode and the fifth electrode, and a wiring portion configured to apply a current through the fourth electrode, the N-type semiconductor, the third electrode, the P-type semiconductor, and the fifth electrode, wherein the third electrode and the fourth and fifth electrodes are configured to form a heat absorbing portion and heat radiating portions.

8. A magnetic head comprising:
a main pole configured to apply a recording magnetic field to a recording layer of a recording medium;
a write shield pole on a trailing side of the main pole with a write gap therebetween;
a recording coil configured to be wound around a magnetic circuit formed of the main pole; and
a temperature control element unit comprising: a first electrode on a leading side of the main pole near a floating surface of the magnetic head and on an outer side of a track edge of the main pole; a second electrode on the leading side of the main pole near the floating surface and on a track center of the main pole; an N-type semiconductor and a P-type semiconductor connected to the first and second electrodes; and a wiring portion configured to apply a current via the second electrode, the N-type semiconductor, the first electrode, and the P-type semiconductor, wherein the first electrode and the second electrode are configured to form a heat absorbing portion and a heat radiating portion.

9. A disk drive comprising:
a disk-shaped recording medium comprising a recording layer;
a drive unit configured to rotate the recording medium;
a slider comprising a facing surface configured to face a surface of the recording medium, and a magnetic head according to claim 1 which is on the slider and configured to perform information processing with respect to the recording medium;
a first current controller configured to apply a current to the recording coil of the magnetic head; and
a second current controller configured to apply a current to the electrodes of the temperature control element unit.

10. The disk drive of claim 9, wherein the first current controller is configured to apply a write signal to the magnetic head, and the second current controller is configured to apply a voltage to the temperature control element unit in asynchronous to the write signal.

11. The disk drive of claim 9, wherein the temperature control element unit comprises a third electrode on an outer side of the first electrodes in a track width direction of the track of the main pole, a fourth electrode and a fifth electrode on outer sides of the third electrode in the track width direction, an N-type semiconductor which connects the third electrode and the fourth electrode, a P-type semiconductor which connects the third electrode and the fifth electrode, and a wiring portion configured to apply a current via the fourth electrode, the N-type semiconductor, the third electrode, the P-type semiconductor, and the fifth electrode, wherein the third electrode and the fourth and fifth electrodes are configured to form a heat absorbing portion and heat radiating portions, and
the second current controller comprises: a control section configured to change a polarity control signal in accordance with a skew angle of the magnetic head; and a preamplifier configured to reverse a polarity of a voltage to be applied to the temperature control element unit by the polarity control signal.

* * * * *